A. HINKLE.
RAKE.
APPLICATION FILED SEPT. 30, 1919.

1,343,366.

Patented June 15, 1920.
2 SHEETS—SHEET 1.

A. Hinkle.
Inventor

Witness

By C.A.Snow & Co.
Attorneys

A. HINKLE.
RAKE.
APPLICATION FILED SEPT. 30, 1919.

1,343,366.

Patented June 15, 1920.
2 SHEETS—SHEET 2.

A. Hinkle,
Inventor

Witness

By C.A. Snow & Co.
Attorneys

UNITED STATES PATENT OFFICE.

ALLISON HINKLE, OF SEDALIA, MISSOURI.

RAKE.

1,343,366. Specification of Letters Patent. Patented June 15, 1920.

Application filed September 30, 1919. Serial No. 327,483.

*To all whom it may concern:*

Be it known that I, ALLISON HINKLE, a citizen of the United States, residing at Sedalia, in the county of Pettis and State of Missouri, have invented a new and useful Rake, of which the following is a specification.

This invention relates to rakes, and more particularly to self cleaning rakes, the primary object being to provide means for cleaning the teeth of a rake, thereby obviating the necessity of the user raising the rake for removing the foreign substance therefrom, by hand.

A further object of the invention is to provide a rake having means attached thereto for automatically cleaning all of the teeth thereof, simultaneously, upon the operation of a single lever.

A still further object of the invention is to provide a device of this character which will be comparatively light in construction, and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:—

Figure 1:
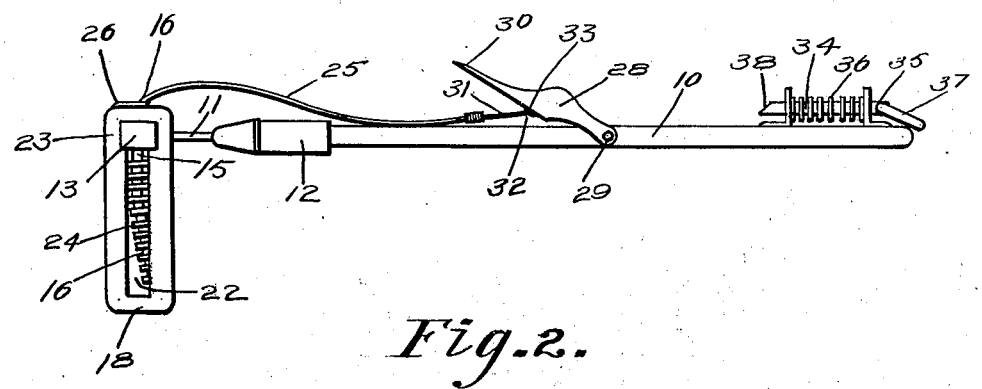
Figure 1 illustrates a side elevational view of a rake constructed in accordance with the present invention.
Figure 2:
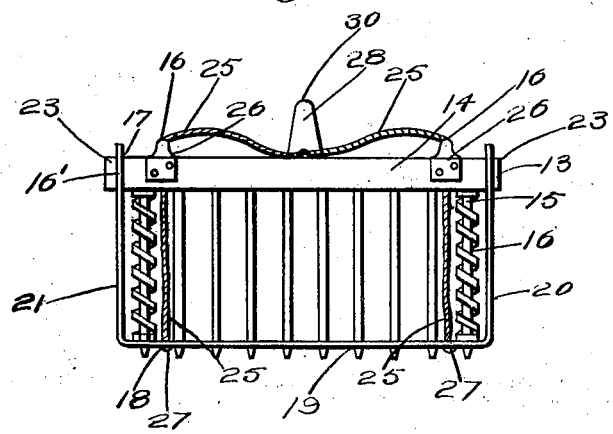
Fig. 2 illustrates an end elevational view of the same.
Figure 3:
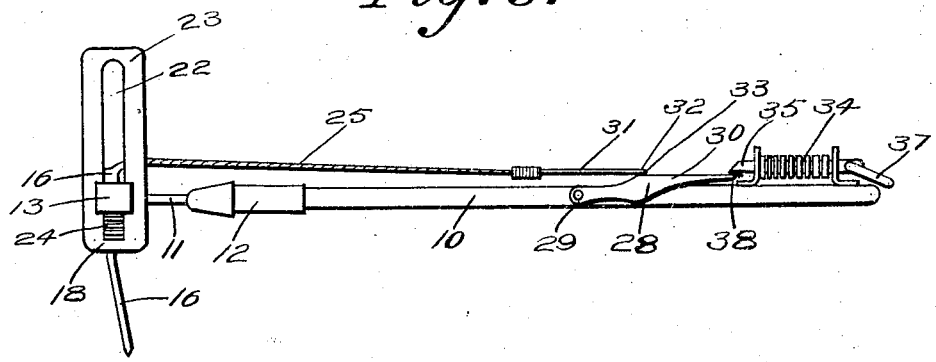
Fig. 3 illustrates a side elevational view of the rake, having the cleaning device attached thereto, the same being shown as held out of its operative position.
Figure 4:
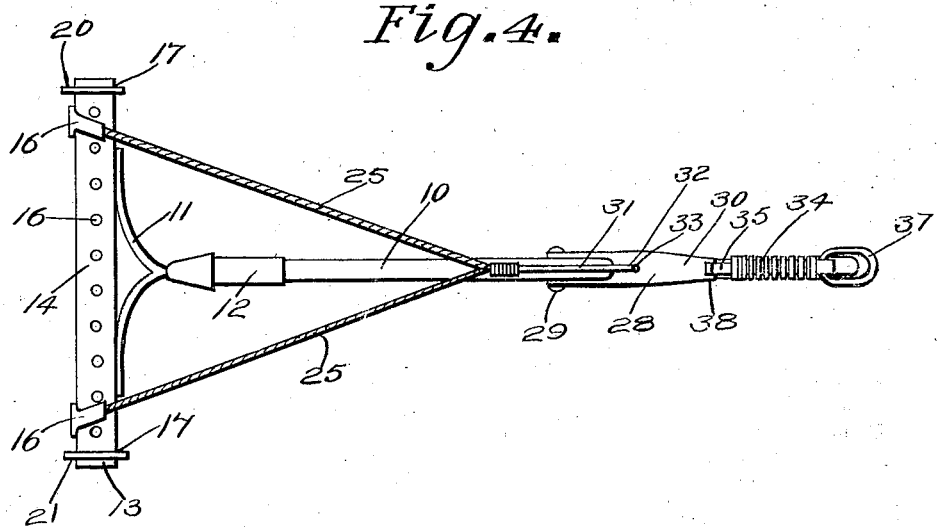
Fig. 4 illustrates a plan view of the same.

Referring to the drawings in detail, the reference character 10 designates the handle of a rake, in one end of which is positioned the shank 11, and held therein, by means of the collar 12, commonly used for securing heads of garden tools to the handles thereof.

The head 13, of the rake, includes an upper horizontal bar 14, in which are positioned the upper ends of the rake teeth 15, the head 13 being also provided with openings 16, extending therethrough, and being disposed adjacent the respective ends thereof.

This upper bar 14, is also provided with heads 16', formed at the opposite ends thereof, and which heads provide slots, or grooves 17, in which operate the cleaning element, to be hereinafter more fully described.

Supported to move longitudinally of the teeth 16, is a cleaning device including the horizontally disposed bar 18, which is provided with a plurality of openings 19, arranged therein to accommodate the teeth 16, of the rake proper, so that the bar 18 will be free to move longitudinally of the rake teeth 16, during the cleaning operation.

The cleaning element also includes the right angled bars 20 and 21, each of which being provided with an elongated slot 22, of a width to embrace the side walls of the upper bar 14 of the rake head 13, adjacent the slot 17, so that the bars 20 and 21 will have a free vertical movement, within the slots 17, but prevented from lateral movement, by means of the flanges 23, forming a part of the respective heads 16'.

Coiled springs 24, embrace the end teeth of the rake, and are disposed between the under wall of the upper bar 14, and the upper wall of the cleaning bar 18, in such a manner that movement upwardly, of the cleaning bar 18, compresses the springs 24, so that when suitable latch mechanism, has been released, the coiled springs 24 urge the cleaning bar 18 along the rake teeth, whereupon the metal between the openings of the bar 18, engages the leaves, or other foreign matter, which has collected on the teeth, and dislodges the same therefrom.

The cleaning bar operating mechanism, includes flexible connecting members 25, which pass through the openings 16, formed in the head 13, the openings being guarded by the guiding members 26, disposed adjacent thereto, and over which operate the flexible members 25, the lower ends of the flexible members 25, having connection with the cleaning bar, as at 27, whereby movement of the flexible connecting members 25, produces a relative movement of the cleaning element.

An operating lever 28, as shown is bifurcated, the furcations thereof, being pivotally connected to the handle 10 of the rake, as at 29, the opposite end of the operating lever 28, being formed into a handle 30, and has connection with the flexible members 25, through the medium of the rigid member 31, which has one of its ends formed into a hook 32, for engagement with the walls of the eye 33, formed on the operating lever 28.

In order that the flexible members 25 may be held in their upper position, the operating lever 28, is adapted to be engaged by a latch mechanism 34, which includes a sliding pin 35, operating against the tension of the spring 36, embracing the sliding pin 35, to normally hold the pin 35 in its extended position, as shown by Fig. 1 of the drawings. The ring member 37, has connection with one end of the pin 35, to facilitate the operation of the pin 35 to disengage the outer end 38 of the pin 35, and the lever 28, whereupon the spring members 24, come into play to move the cleaning element, to accomplish the cleaning result. The end 38, of the pin 35, is shown as beveled, so that movement of the lever 28, to bring the handle 30 adjacent the latch member, causes the latch member to move longitudinally of the handle 10, whereupon the same moves to engage over the handle 30, to lock the same, together with the cleaning element, in an inoperative position.

It is believed that the foregoing description clearly sets forth the operation of applicant's invention, and that a detailed description of the operation is unnecessary.

Having thus described the invention, what is claimed is:—

1. In a self cleaning rake, a rake head including teeth, a cleaning element comprising a cleaning bar having a plurality of openings to accommodate the teeth, coiled springs being supported by predetermined teeth, said coiled springs being interposed between the lower edge of the head of the rake and the cleaning bar, means for moving the cleaning bar for compressing the springs, said means adapted to normally support the cleaning bar in close proximity to the head of the rake, and means for operating the first mentioned means.

2. In a self cleaning rake, a rake head including teeth, a cleaning element comprising a bar having a plurality of openings to accommodate the teeth, coiled springs interposed between the rake head and the bar, flexible members having connection with the cleaning bar for normally compressing the springs, a lever having connection with the flexible members and a locking means associated with the lever for securing the lever in a position to support the cleaning bar against the tension of the coiled spring.

In testimony that I claim the foregoing as my own, I have hereto affixed my signature in the presence of two witnesses.

ALLISON HINKLE.

Witnesses:
 C. S. BROSIUS,
 O. S. BROWN.